Patented July 6, 1943

2,323,868

UNITED STATES PATENT OFFICE 2,323,868

PREPARATION OF OXIDE TYPE CATALYSTS

Everett C. Hughes, Cleveland Heights, Ohio, assignor to The Standard Oil Company, Cleveland, Ohio, a corporation of Ohio No Drawing. Application August 31, 1940, Serial No. 355,093

2 Claims. (Cl. 252—254)

In making precipitated catalysts involving aluminum, it has heretofore been customary to merely take the solutions sufficient for the precipitation, and no particular attention has been given the matter of hydrogen ion concentration as regards possible bearing on the properties of the product. I have now found, surprisingly, that if the pH be raised to a higher numerical value than customary or necessary to accomplish precipitation, an exaggerated activity of the catalyst results.

To the accomplishment of the foregoing and related ends, the invention, then, comprises the features hereinafter fully described, and particularly pointed out in the claims, the following description setting forth in detail certain illustrative embodiments of the invention, these being indicative however, of but a few of the various ways in which the principle of the invention may be employed.

In preparing oxide catalysts involving precipitation of aluminum hydroxide, either alone, or in combination with oxides of the metals of group VI or VIII or oxides of the fourth group having molecular weight at least 28, the invention involves providing a pH in excess of 9.0, for instance, 9.0 to 11.0, and preferably around 10.0. A pH higher than 10.0 can be used, insofar as increased activity of the catalyst is concerned, but as a practical matter in cases where the pH is substantially greater than 10.0, there is a loss of aluminum in the precipitation through solubility of the aluminate, and consequently the ultimate concentration of aluminum in the precipitated catalyst is not so exactly controlled. There is also, of course, the actual loss, which in commercial large scale operation is a practical factor. A pH lower than 9.0 is undesirable, because catalysts so prepared have low activity as compared with those in the preferred range noted.

An aluminate solution, for instance, containing sufficient excess NaOH to render the solution relatively stable to hydrolysis, is mixed, for the precipitation, with a salt of a metal which is to be the other component of the catalyst, with or without the presence of free acid. By properly adjusting the amounts of free alkali and free acid, the desired pH in the liquor may be attained to obtain a catalyst of optimum activity, as indicated. Thus, an aluminate solution and a solution of a salt or chromium or molybdenum or tungsten or compound of the Fourth periodic group may be mixed together, of atomic weight above carbon, or a compound of the Eighth group metals, the pH being carefully adjusted into the high range noted, and the precipitate is formed. Aluminates of sodium, potassium, quaternary alkyl ammonium, etc., may be employed. Desirably, the initial hydroxide precipitate is allowed to stand for some time, say several hours, and then the liquid is separated, as by filtration. The precipitate need not be washed at this stage. Or one wash with about an equal amount of water may be carried out, and the precipitate may be then dried, thoroughly. By drying for a prolonged period in air at elevated temperature, but below the boiling point of water, and then following up by several hours drying at still higher temperature, preferably in a vacuum, the dry catalyst is in such structural form that it may then be washed thoroughly and thus be freed of adsorbed ions as impurities.

As an example: A sodium aluminate solution containing 0.25 mol NaOH per mol, and a chromium acetate solution are mixed, to precipitation, and the precipitate is separated and further treated as desired.

Instead of the acetate, other chromium salts may be applied, as chromium nitrate, chloride, etc., preferably in the presence of acetate ions, which may be supplied with the acid used to adjust the pH.

As illustrative of the difference in properties of catalysts prepared with extra high pH in contrast to those with the ordinary pH, a catalyst precipitated from a sodium aluminate solution prepared from 2.4 mols of $Al(OH)_3$ and a solution containing 0.6 mol of chromium acetate and 75 g. of concentrated $H_2SO_4$ yielding a pH in the liquor of 7.35, on being ultimately run in treatment of a petroleum naphtha from Michigan stock, in 2½ hours at 935° F. at a flow rate of one volume per volume of catalyst per hour showed a formation of 17% aromatics and unsaturates in the product; while a catalyst prepared from the same components of sodium aluminate and chromium acetate but having only 30 g. of concentrated $H_2SO_4$ present in the precipitating liquor and thereby giving a pH 10.05 instead of 7.35 as in the foregoing instance, on a run with the same kind of naphtha and the same operating conditions, showed a yield of 50% aromatics and unsaturates in the product. Furthermore, when the first-mentioned catalyst was regenerated by air treatment as in customary practice and was put on another run, this run yielded only 16% aromatics and unsaturates; while the second catalyst similarly regenerated and put on another run, yielded 50% aromatics and unsaturates in the product.

Other modes of applying the principle of the invention may be employed, change being made as regards the details described, provided the features stated in any of the following claims, or the equivalent of such, be employed.

I therefore particularly point out and distinctly claim as my invention:

1. In preparing for aromatizing operations on hydrocarbons, making a chromium-aluminum oxide gel type catalyst by mixing solutions of salts consisting of a chromium salt and an aluminate, supplying acetate ions with an acid, and adjusting the pH to a numerical value of substantially 10 and precipitating.

2. In preparing for aromatizing operations on hydrocarbons, making a chromium-aluminum oxide gel type catalyst by mixing solutions of salts consisting of a chromium salt and an aluminate, and adjusting the pH to a numerical value of at least 10 and precipitating.

EVERETT C. HUGHES.